(12) United States Patent
Boissy

(10) Patent No.: US 10,392,116 B2
(45) Date of Patent: Aug. 27, 2019

(54) DE-ICING SYSTEM FOR AIRCRAFT

(71) Applicant: Safran Aerosystems, Plaisir (FR)

(72) Inventor: Loic Boissy, Louviers (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 65 days.

(21) Appl. No.: 15/109,336

(22) PCT Filed: Jan. 21, 2015

(86) PCT No.: PCT/IB2015/050474
§ 371 (c)(1),
(2) Date: Jun. 30, 2016

(87) PCT Pub. No.: WO2015/110974
PCT Pub. Date: Jul. 30, 2015

(65) Prior Publication Data
US 2016/0325842 A1    Nov. 10, 2016

Related U.S. Application Data

(60) Provisional application No. 61/930,097, filed on Jan. 22, 2014.

(51) Int. Cl.
*B64D 15/16* (2006.01)

(52) U.S. Cl.
CPC .................................. *B64D 15/166* (2013.01)

(58) Field of Classification Search
CPC ....... B64D 15/00; B64D 15/16; B64D 15/166
See application file for complete search history.

(56) References Cited

U.S. PATENT DOCUMENTS 4,361,298 A * 11/1982 Trares .................. B64D 15/166
                                                          244/134 A
4,508,295 A *  4/1985 Cattaneo ................ B64D 15/16
                                                          244/134 A
(Continued)

FOREIGN PATENT DOCUMENTS

| EP | 0173162 | 3/1986 |
|----|---------|--------|
| EP | 0590553 | 4/1994 |
| GB | 2128155 | 4/1984 |

OTHER PUBLICATIONS

International Patent Application No. PCT/IB2015/050474 Search Report and Written Opinion dated May 12, 2015.
(Continued)

*Primary Examiner* — Joseph W Sanderson
(74) *Attorney, Agent, or Firm* — Kilpatrick Townsend & Stockton LLP; Dean W. Russell; Kristin M. Crall

(57) ABSTRACT

Systems and methods for de-icing an aircraft surface. The systems create a shock pulse to create a shock activation. The shock pressure is designed to deform the surface of an erosion shield on the surface in order to expulse ice from the wing. The deformation may be between a negative to a positive shape. In one example, the de-icing occurs from a pulse delivered by pressurized fluid injected into and quickly removed from a recess between the aircraft surface and an erosion shield. A pulse of pressurized air or fluid may be injected into one or more cells formed in the recess, together or alternatively, according to the designed effect on the erosion shield surface.

26 Claims, 5 Drawing Sheets

(56) References Cited

U.S. PATENT DOCUMENTS

| | | | | |
|---|---|---|---|---|
| 4,516,745 A * | 5/1985 | Ely | | B64D 15/166 244/134 A |
| 4,706,911 A * | 11/1987 | Briscoe | | B64D 15/16 244/134 A |
| 4,747,575 A | 5/1988 | Putt et al. | | |
| 4,865,291 A | 9/1989 | Briscoe et al. | | |
| 5,098,037 A * | 3/1992 | Leffel | | B64D 15/166 244/134 A |
| 5,248,116 A | 9/1993 | Rauckhorst | | |
| 5,275,362 A * | 1/1994 | Weisend, Jr. | | B64D 15/166 244/134 A |
| 5,314,145 A * | 5/1994 | Rauckhorst, III | | B64D 15/166 244/134 A |
| 5,356,096 A * | 10/1994 | Rauckhorst, III | | B64D 15/166 244/134 A |
| 5,393,014 A * | 2/1995 | Weisend, Jr. | | B64D 15/166 137/625.21 |
| 5,489,073 A * | 2/1996 | Leffel | | B64D 15/166 244/134 R |
| 5,904,322 A * | 5/1999 | Giamati | | B64D 15/166 244/134 B |
| 5,921,502 A * | 7/1999 | Al-Khalil | | B64D 15/163 244/134 A |
| 6,129,314 A * | 10/2000 | Giamati | | B64D 15/00 244/134 A |
| 6,196,500 B1 * | 3/2001 | Al-Khalil | | B64D 15/16 244/134 B |
| 6,283,411 B1 * | 9/2001 | Giamati | | B64D 15/12 244/134 A |
| 9,067,685 B2 * | 6/2015 | Delrieu | | B64D 15/16 |
| 2003/0122037 A1 | 7/2003 | Hyde et al. | | |
| 2013/0277501 A1 * | 10/2013 | Delrieu | | B64D 15/16 244/134 A |

OTHER PUBLICATIONS

European Patent Application No. 15706063.3, Communication Pursuant to Rules 161(1) and 162 EPC, dated Sep. 6, 2016.

International Patent Application No. PCT/IB2015/050474, International Preliminary Report on Patentability dated Aug. 4, 2016.

* cited by examiner

DE-ICING SYSTEM FOR AIRCRAFT

CROSS REFERENCE TO RELATED APPLICATIONS

This application is the U.S. national phase entry of International Patent Application Ser. No. PCT/IB2015/050474, filed Jan. 21, 2015, which application is related to and claims the priority benefit of U.S. Provisional Application Ser. No. 61/930,097, filed Jan. 22, 2014, titled "Pneumo Expulse De-icing system," the entire contents the each of which are hereby incorporated by reference.

FIELD OF THE DISCLOSURE

Embodiments of the present disclosure relate generally to systems and methods for de-icing an aircraft surface. The systems create a shock, particularly using hydraulic or pneumatic activation to create a shock pulse. The shock pulse can create a positive deformation of an erosion shield positioned over a recess in the aircraft surface. The shock from deformation/movement of the erosion shield causes ice to be dislodged from the surface. The shock pulse can be created by alternating between delivery of a pressurized fluid and a vacuum, although other methods for creating a shock pulse are possible.

BACKGROUND

Under certain operating conditions, aircraft are vulnerable to accumulation of ice on component surfaces such as propellers, air intake, and the wings. If left unchecked, this ice accumulation can laden the aircraft with so much additional weight that the component configuration, e.g., the airfoil configuration of the wings or other aerodynamic properties, are altered. This can cause undesirable and dangerous flying conditions. Ice protection systems on aircraft are thus required to ensure safety of flight, regardless of the environmental conditions experienced.

A variety of systems have been proposed for removing ice from aircraft during flight or for preventing its initial accumulation on the leading edge surfaces.

For example, some systems seek to remove ice once it has formed. These systems may be referred to as "de-icing" systems. Other systems seek to prevent the accumulation of ice altogether in the first place. These systems may be referred to as "anti-icing" systems. Although an anti-icing mode may ensure high aircraft performances by avoiding any ice accretion on the external surface protected, an anti-icing mode is more energy-consuming and requires continuous operating of the anti-icing zone(s). By contrast, a de-icing mode generally removes ice from the desired surface according to pre-defined cycles (activation periods) that are compatible with a maximum ice thickness acceptable to conserve surface performances. The protection mode is often chosen according to performance losses acceptable, as well as according to power available on the aircraft. These various systems can be categorized as thermal, chemical, or mechanical.

Thermal anti-icers or de-icers primarily use a joule/heating effect to maintain a surface at a sufficient temperature to avoid ice or to remove it. Heat may be applied through a heating element or via heated gasses that are circulated. The heat can either prevent the accumulation of ice or it can melt/loosen ice that has formed. Once loosened, the ice is generally blown from the aircraft.

For chemical de-icing, a chemical compound may be applied to all or a part of the surface to be protected. This may limit adhesion of the ice or it may alter the freezing point of water collecting on the surface.

Mechanical de-icers often use actuators to deform the external surface to remove ice. These methods generally require a minimum ice thickness to be efficient. Additionally, surface deformation maintained over a long period can impact aerodynamic performance of the surface to be protected. One example of a mechanical de-icer uses air chambers or tube-like structures that are embedded into an elastomeric assembly. The air chambers can be inflated in order to deform the surface. Upon inflation, the air chambers expand the leading edge profile and cause cracking of the ice. Inflation time is usually a few seconds or longer. Such de-icers can be installed behind an erosion shied in order to improve environmental resistance. They generally extend the entire span of the wing or surface to be protected from ice. These systems are often referred to as pneumatic boots.

Another example of a mechanical de-icer system is an electromagnetic system. These systems include a magnetic coil installed between an aircraft structure and an erosion shield, and an electronic system to generate an electrical impulse to activate a coil. The coils can be spaced so that when the coils are activated, a torsional wave mode deformation of the skin can occur, which causes ice removal. In another example, a deflection wave mode deformation can be generated in the skin by activation of two electromagnetic coils. Although improvement attempts have been made, further improvements to de-icing systems and technologies are desirable.

BRIEF SUMMARY

Embodiments of the present disclosure relate generally to systems and methods for de-icing an aircraft surface. The systems create a shock pulse, particularly using hydraulic or pneumatic activation to create a shock wave. The shock pulse is designed to deform the surface of an erosion shield on the aircraft surface in order to expulse ice from the surface. In one example, the aircraft surface may be a wing of the aircraft.

The de-icing may occur from a pulse delivered by pressurized fluid injected into and removed from a recess between the aircraft surface and an erosion shield. In one specific example, the recess may be a space that is formed having a depth of about 1 mm or less in the aircraft surface. In one example, the recess may be between about 0.2 and about 0.8 mm. In a more specific embodiment, the recess may be between about 0.4 and about 0.6 mm. The recess may contain one or more unitary cells. The unitary cells may be divided from one another via seals or via any other dividing feature, as outlined in more detail below.

In one embodiment, pressurized fluid can be delivered to and removed from the one or more unitary cells very quickly. In one embodiment, the pressurized fluid can be removed via vacuum. In one embodiment, the pressurized fluid can be a pressurized gas or air.

Ice is generally expulsed from the erosion shield due to the expansion of the erosion shield due to the "pop" that is generated at the surface of the erosion shield. This expansion can be referred to as a "positive pulsed shape." This expansion can occur in a very short period of time. In one example, the time may be generally less than 25 ms. In another example, the time may be between about 5 ms and about 25 ms. In a more specific example, the time may be between about 12 ms and about 23 ms. Return of the erosion shield to its resting or slightly negative shape can occur due to application of a vacuum to the recess.

In one specific example, the shock may be created by opening of valves in one or more unitary cells formed within the recess between the aircraft surface and the erosion shield. Pressurized air or fluid flows into the one or more unitary cells to create the desired shock for ice expulsion. A pulse of pressurized air or fluid may be injected into one or many cells, together or alternately, according to the effect required on the erosion shield surface. The effect may be one or more waved pulses.

In some examples, embodiments provide a de-icing system for an aircraft surface, comprising: at least one recess created in the surface, the recess comprising at least one cell, the at least one cell comprising a port system for separately delivering a vacuum to the cell and a pressurized fluid to the cell; and an erosion shield covering the recess.

The recess may comprise a plurality of unitary cells. The plurality of unitary cells may share a common erosion shield. In another example, each of the plurality of unitary cells may comprise its own erosion shield. The plurality of unitary cells may comprise individual activation zones for applying a pulse to a portion of the erosion shield covering the unitary cell. The plurality of unitary cells may be divided from one another via one or more delimiting or dividing features. The one or more delimiting or dividing features comprise raised protrusions; thermoset, thermoplastic, or elastomeric dividers; seals, metal rods; grooves; a pattern formed in the recess; one or more machined walls to create local extra thicknesses; an elastomer profile bonded to the recess; a raised protrusion; a pattern created within the recess to divide the recess into one or more unitary cells; an integrally formed surface; or any combination thereof. In one specific example, each unitary cell may be bordered by a seal and covered by an erosion shield sized to cover the cell. The recess may be about 1 mm or less; between about 0.2 mm and about 0.8 mm; or between about 0.4 mm and about 0.6 mm.

The erosion shield may cover the recess and creates a waved pulse upon application of pressurized fluid to the recess. Application of pressurized fluid may be between about 5 ms to about 25 ms; between about 12 ms to about 23 ms; or for 25 ms or less. The pressurized fluid may comprise compressed or pressurized gas, such as pressurized air. In another example, the pressurized fluid may comprise a hydraulic fluid, a hydraulic oil, a fluid containing one or more anti-icing agents, a thermal fluid, or any combination thereof.

The port system may comprise a first port fluidly connected to a vacuum line and a second port fluidly connected to a pressurized fluid source. A first valve associated with the first port, a second valve associated with the second port, or both. In one example, introduction of pressurized fluid into the second port when the first port is closed may cause the erosion shield to create a slight positive pulsed shape.

Introduction of vacuum into the first port when the second port is closed causes the erosion shield to lie in a slightly negative shape.

In another example, there is provided a de-icing system for an aircraft structure, comprising: an erosion shield over a recess in the aircraft structure; a system for creating a shock pulse across the erosion shield from within the aircraft structure, such that a pressurized fluid is delivered to the recess between the aircraft structure and the erosion shield. The shock pulse may comprise a pneumatic shock pulse. A mechanical effect on the erosion shield may be created by shock pulse due to injection of a pressurized fluid in the recess between the aircraft structure and the erosion shield. In any of these examples, the aircraft structure may comprise a leading edge of an aircraft wing.

In another example, there may be provided a method for de-icing an aircraft surface, comprising applying a shock wave to deform an erosion shield covering a recess in the aircraft surface; and returning the erosion shield to its initial position. The method may include an arming phase, in which the erosion shield is caused to take a negative shape. The method may include the negative shape being caused by vacuum in the cell, or via a mechanical system. The method may include the erosion shield being pulsed to a positive shape. The method may include the erosion shield being pulsed in a vibrating mode.

BRIEF DESCRIPTION OF THE DRAWINGS

This disclosure will be better understood and other features and advantages will become apparent upon reading the following detailed description, including embodiments as particular non-limiting examples with reference to the attached drawings, can be used to complete the understanding of the present invention and the disclosure of its implementation and, where appropriate, contribute to its definition, in which.

DETAILED DESCRIPTION

Figure 1:
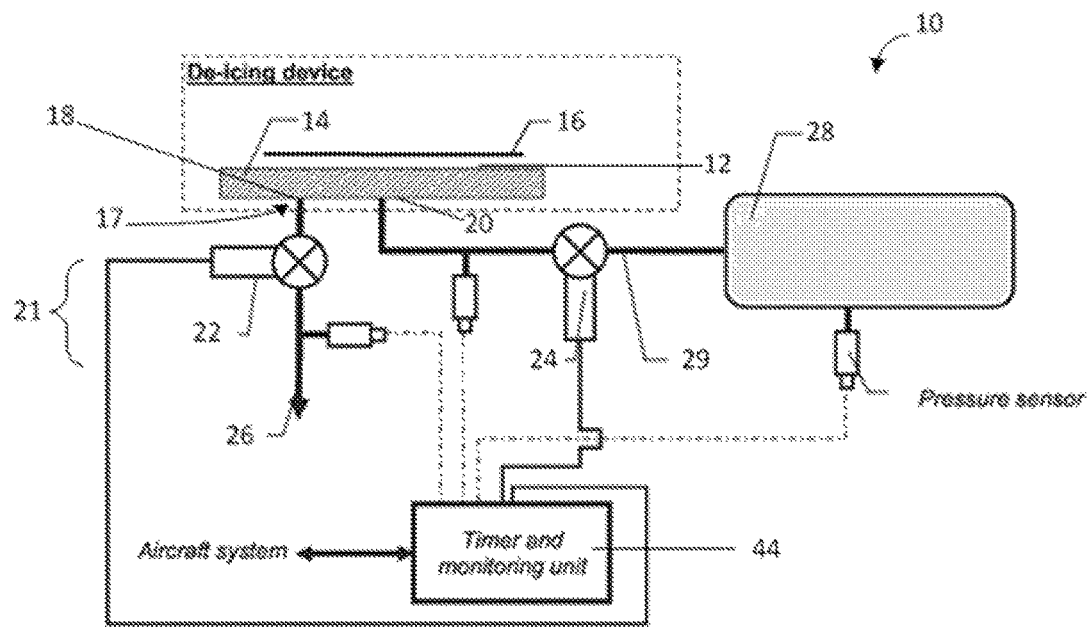
FIG. 1 shows a schematic of one embodiment of a de-icing system.

It should be understood that the appended drawings are not necessarily to scale, and may present a somewhat simplified representation of various features illustrative of the basic principles of this disclosure. Any specific design features disclosed herein, including, for example, specific dimensions, orientations, locations, and shapes, will be determined in part by the particular intended application and use environment. In the Figures, reference numerals refer to the same or equivalent parts throughout the several Figures of the drawings.

Embodiments of the present invention provide a de-icing system 10 designed to create a shock or pulse or vibration. Specific embodiments may use hydraulic or pneumatic activation. In some embodiments, the system may be referred to as a pneumo-expulse system. The shock deforms the surface of an erosion shield and expulses ice that may have accumulated thereon.

In one embodiment, there may be at least one recess 12 formed on an aircraft structure 14. In other embodiments, there may be a plurality of recesses 12 formed on an aircraft structure. When the system 10 is installed on a profile, the structure 14 may be the leading edge of the aircraft wing. The recess 12 may be created as an indentation or cavity directly on or in the aircraft structure 14. The recess may be divided into one or more unitary cells 32 via one or more delimiting or dividing features 34.

An erosion shield 16 may be positioned over the recess. The erosion shield 16 may be shaped to cover the recess 12 for creating a waved pulse upon application of pressurized fluid to at least one unitary cell 32 of the recess 12.

Figure 5:
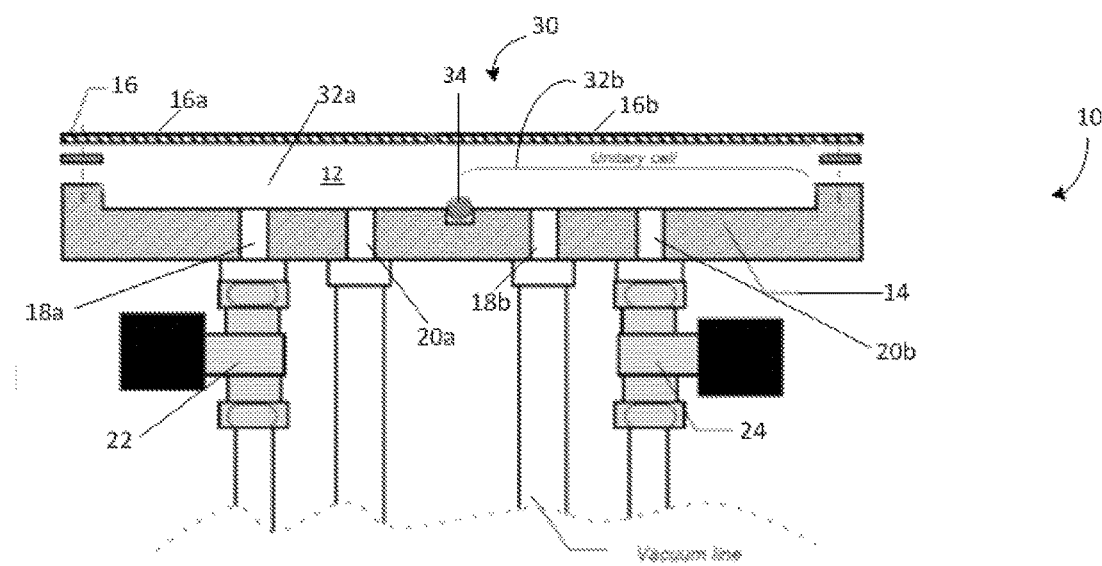
FIG. 5 shows an alternate schematic of a de-icing system, showing a unitary cell of the recess.

In one example, the recess 12 may be formed as an indentation area on the aircraft structure surface 14, such that the recess 12 dips below the longitudinal plane of the structure 14. This example is shown in FIG. 5. The depth of recess 12 may be about 1 mm or less. In one example, the depth of the recess 12 may be from about 0.1 mm up to about 1 mm. In one specific embodiment, the depth of recess 12 may be between about 0.2 mm and about 0.8 mm. In a more specific embodiment, the depth of recess 12 may be between about 0.4 mm and about 0.6 mm.

In another example, the recess 12 may be formed as a space between the longitudinal plane of the aircraft structure surface 14 and the erosion shield 16, as shown in the schematic of FIG. 1. In this example, the recess 12 need not be an actual indentation on the aircraft surface, but simply a location of the aircraft surface featuring the described port system.

In order to deliver the desired fluid into the recess 12, the recess 12 may have a port system 17. The port system 17 includes at least one port. The at least one port is generally configured to allow a vacuum and/or a pressurized fluid to be delivered to the recess 12 via a valve system 21. The valve system 21 may include one or more valves. In one specific embodiment, the valves may be high speed valves. In one embodiment, the valves may be configured for pneumatic or hydraulic discharge. A shock pulse may be generated by the opening of one or more valves that deliver pressurized fluid to the recess 12.

Figure 2:
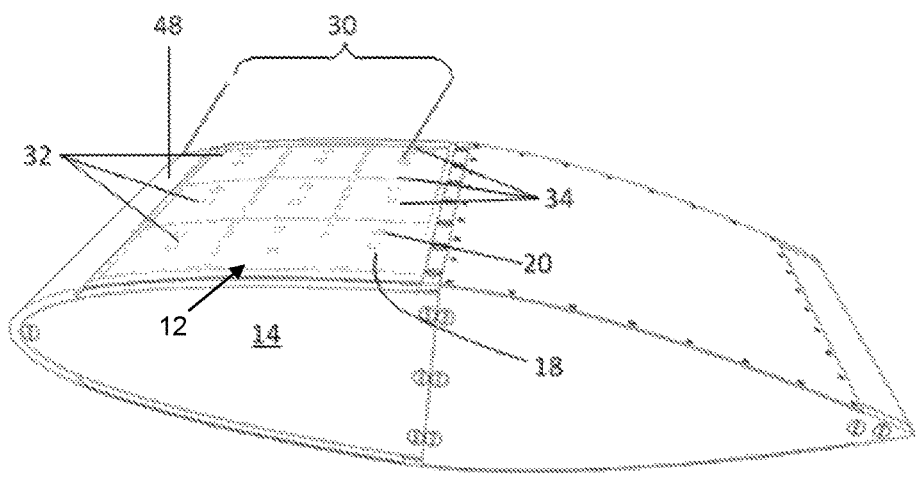
FIG. 2 shows a side perspective view of an aircraft wing surface incorporating a de-icing system with the erosion shield removed to show the port system.
Figure 3:
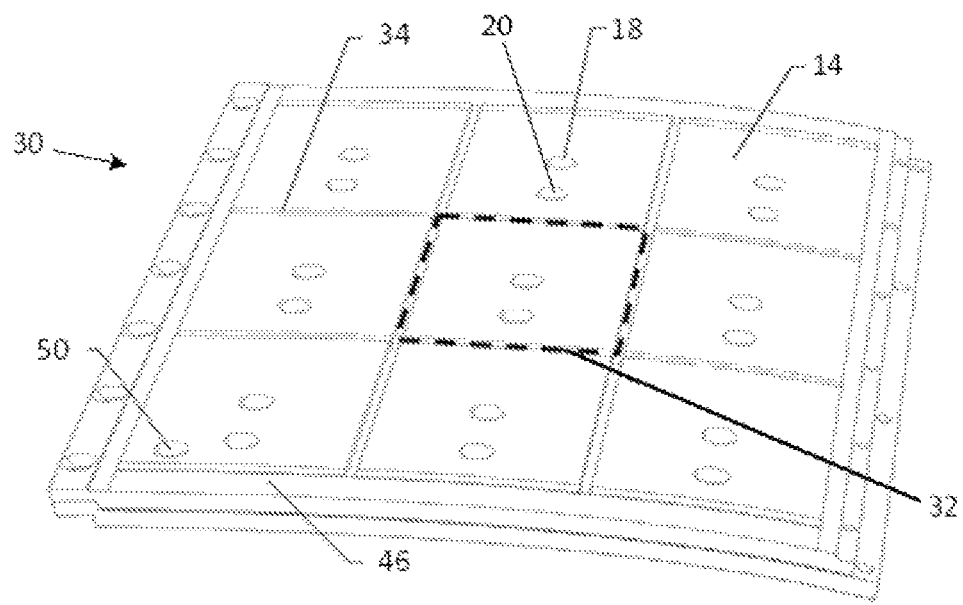
FIG. 3 shows a top perspective view of the surface of FIG. 2.

According to the particular embodiment shown in FIGS. 1-3, the recess 12 may be provided with a first port 18 and a second port 20. The first port 18 may be fluidly connected to a first valve 22. The second port 20 may be fluidly connected to a second valve 24. One of the ports may be configured to receive vacuum from a vacuum line 26. Another of the ports may be configured to receive pressurized gas or air via a pressure line 29 from the pressurized system of the aircraft. In one alternative or complementary embodiment, there may be provided a separate pressure tank 28 to deliver the desired pressurized air. It may be possible for a single vacuum line 26 to service one or a plurality of recesses 12. Similarly, it may be possible for a single pressurized fluid line 29 to service one or a plurality of recesses 12.

Figure 9:
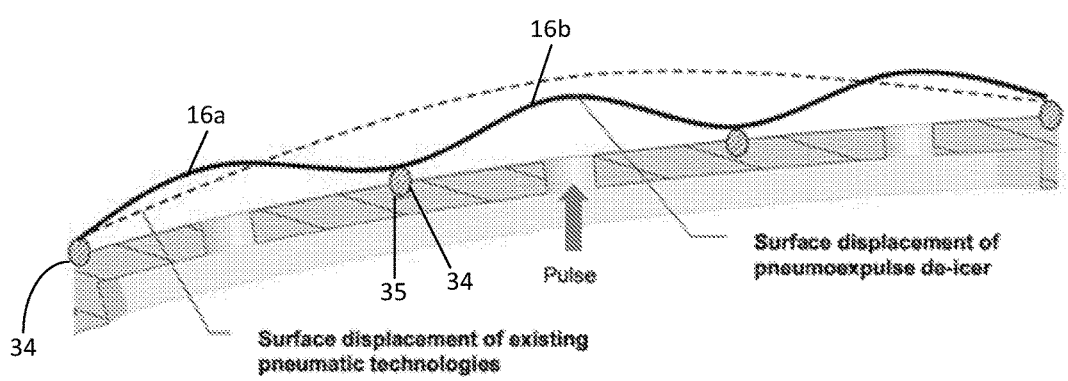
FIG. 9 shows a comparison of a traditional surface displacement of an inflatable tube of the prior art in a dotted line and the surface displacement provided by the embodiments of the de-icing system disclosed.

In an alternate configuration, it is possible to provide a single port that is controlled by a three way valve. A single port option is illustrated by FIG. 9. The three-way valve may be fluidly connected to a vacuum line as well as to a pressure tank, such that vacuum may be applied into the port in a first mode and pressurized fluid may be applied into the port in a second mode, depending upon the configuration of the three-way valve.

In any event, the system is designed to allow vacuum to be applied to the recess 12 or to allow pressurized fluid to be applied to the recess 12, depending upon activation of the valve system. Although embodiments with one and two ports per recess 12 are described, it should be understood that the quantities of ports may vary.

The fluid may be air (such as ambient air and/or air from a pressurized air source), a liquid, a hydraulic fluid, a hydraulic oil, a fluid containing one or more anti-icing agents, a thermal fluid, or any other appropriate fluid, or any combination thereof.

The size and shape of the recess 12 design can be selected according to the technology of activation (air or liquid), to the geometry of the profile to protect, and to the expected thickness of ice to be removed or other ice protection strategy. The size, the number, and the geometry of the cells provided will be impacted by these criterions.

In one specific embodiment, the recess 12 may be divided into one or more unitary cells 32. The unitary cells 32 may be divided from one another so as to provide individual activation cells. The unitary cells may be divided from one another via delimiting or dividing features 34.

As shown in FIG. 2, the system may be provided as one or more de-icing zones 30. FIGS. 2 and 3 illustrate a zone 30 with the erosion shield removed so that the individual cells 32 formed in the recess 12 and their ports 18, 20 are visible. The cell pattern provided may create individual activation zones on the outer surface of the erosion shield 16. Although square-shaped cells 32 are shown, it should be understood that the cells may be any appropriate shape and dimension and number. They may be designed according to the shape of the aircraft structure (such as a leading edge) that they are designed to protect. They may be square, circular, oblong, rectangular, triangular, hexagonal, or any other appropriate geometry or shape.

The cells 32 may be any appropriate width or depth. Non-limiting examples include from about 20 mm to about 150 mm. The shape and depth of each cell 32 can be varied based on the above discussed parameters. In one specific example shown, the zone 30 may include one or more cells 32 that are similarly shaped and positioned adjacent to one another. In one example, the cells 32 may be positioned in a linear line, edge-to-edge, along the aircraft wing. In another example, the cells 32 may be positioned in clusters or groups.

Each unitary cell 32 of the recess 12 may be bounded by a delimiting or dividing feature 34. Such features may seal, or rod, or other dividing feature. In another embodiment, the cell delimitation function may be accomplished by machining one or more walls of the cell structure to create local extra thicknesses. In another embodiment, the cell delimitation function may be accomplished by bonding of an elastomer profile such as silicone, nitrile, polyurethane, or any other material to an area where a delimitation or dividing feature is desired. In another embodiment, the cell delimitation function may be accomplished by introduction of rods in metal, thermoset or thermoplastic composites, or any other appropriate materials. In another embodiment, the cell delimitation function may be accomplished via any raised protrusion. In another embodiment, the cell delimitation function may be accomplished via any method of fluidly insulating cells from one another. In another embodiment, the cell delimitation function may be accomplished via any pattern created within the recess to divide the recess into one or more unitary cells. The delimiting or dividing features may be fixed to the recess surface, may be integrally formed with the recess surface, or may be formed via any other appropriate method. For example, grooves may be formed into the recess to maintain a dividing structure in place. In another example, the dividing features are adhered or otherwise fixed to the recess surface. It should be understood that other delimiting or dividing features are possible and considered within the scope of this disclosure.

Figure 7:
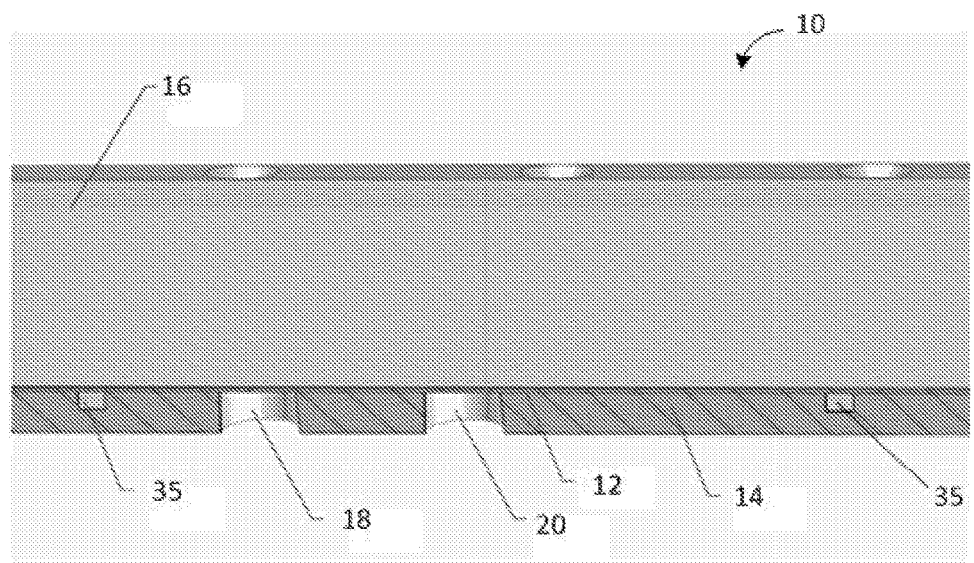
FIG. 7 shows a side cross-sectional view of a de-icing system.

The delimiting or dividing features 34 can be designed to maintain the pressurized fluid within the cell 32 and to allow the pressurized fluid to be vacuumed or otherwise removed from the cell 32 without affecting nearby cells. In one example, a single erosion shield 16 may be applied over all cells 32 in a zone 30, as shown in FIGS. 2 and 3. In this example, a seal 34 may be applied around the edges of the zone. In an alternate example, each individual cell 32 may have its own erosion shield 16 covering its space. In this example, a seal 34 may be applied at each edge of each cell. If provided, the seal 34 may be pressed into or otherwise situated with respect to a groove 35 that is formed at the outer bounds of the cell 32 on the aircraft structure 14. If a rod or other raised structure is used to create the delimitation, it may be secured, glued or otherwise adhered in the desired location or it may be positioned in a similar groove 35. (An example of a groove 35 without a seal or rod positioned therein is illustrated by FIG. 7.)

Each unitary cell 32 may be separated from the other cells using any of the above described delimiting or dividing features 34 to ensure local deformation of the erosion shield 16. The delimiting or dividing features 34 are provided in order to create one or more separate cells 32 within the recess 12. This can enable each unitary cell 32 to affect the erosion shield with its own pulse, so as to provide an erosion shield 16 area that has a number of varying protrusions/areas that are pressured up. The recess 12 may be thus created by a recess designed in the structure 14 to allow erosion shield 16 deformation, and individual cells 32 may be provided in that recess area.

Figure 8:
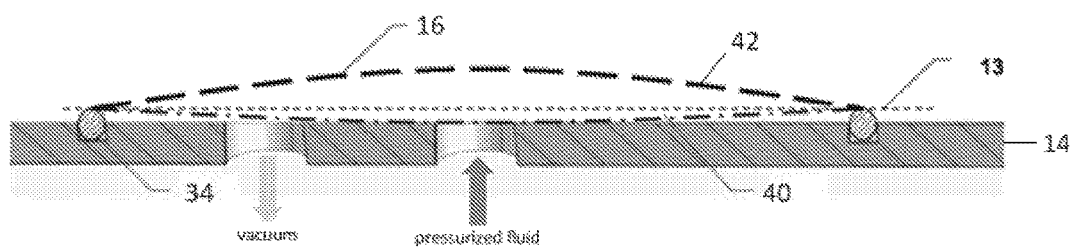
FIG. 8 shows a side-cross-sectional view of the de-icing system of FIG. 7 with the erosion shield shown in its varying positions during use.

For example, FIG. 5 illustrates a single recess area 12 with multiple cells 32 formed therein. The cells may be divided by delimiting or dividing features 34. In a specific embodiment, the delimiting or dividing features comprise one or more seals. Pressure applied to unitary cell 32a into ports 18a, 20a affects erosion shield at area 16a. Pressure applied to unitary cell 32b into ports 18b, 20b affects erosion shield at area 16b. Area 16a may rise at its apex to form a raised, positive pulsed shape curved area 16a. One example of this is shown by FIG. 9. Area 16b may similarly rise at its apex to form a raised, positive pulsed shape curved area 16b. This is also illustrated by FIG. 9. FIG. 8 shows this action positive pulsed action outward by line 42, as it occurs over a single unitary cell 32. When vacuum is applied, a slight negative shape is achieved, as outlined by line 40. Line 13 illustrates the non-operated positioned of the erosion shield 16.

As shown in FIGS. 2 and 3, each cell 32 may be equipped with one or more ports 18, 20 for delivery of pressure and/or vacuum to space formed by each cell surface 32 and the erosion shield 16. The quantities of ports may vary anywhere from one port to up to ten ports per cell for pressure and vacuum. (In some embodiments, providing multiple ports can allow for connection of a pressure sensor, an additional vacuum line, one or more pulse injectors, or any other use.) The ports may have any appropriate dimensions. In one specific example, the diameter of the ports may be from about 3 mm to about 15 mm.

Figure 4:
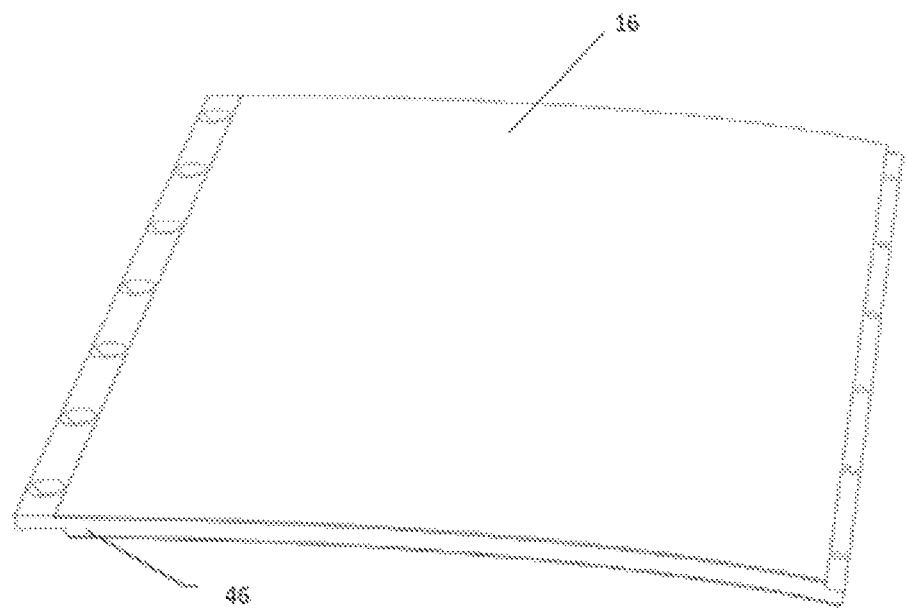
FIG. 4 shows the surface of FIG. 2 with an erosion shield in place.

As shown in FIG. 4, the erosion shield 16 may be applied over multiple cells 32. The erosion shield 16 may be secured at border 46 around the zone. The assembly of the erosion shield 16 on the structure 14 creates the recess 12 that is activated by pulses described herein. The seals 34 between the cells 32 are able to create "mini-pulse" sections 16a, 16b as illustrated by FIG. 9. In another example, a single erosion shield may be provided for each cell 32.

The erosion shield 16 used for the de-icing system 10 can be any appropriate material that provides protection for the one or more cells 32 and related port systems 17 and that also allows the desired deformation upon application of pressure. In one specific example, the erosion shield material may be metallic (such as stainless steel, aluminum, or titanium, combinations thereof, or any other appropriate metallic materials). In another example, the erosion shield material may be a thermoset material (such as epoxy resin) or a thermoplastic material (such as PEEK, PA, PPS, PPSU, PPA), combinations thereof, or any other appropriate plastic-based materials.

Thermoset or thermoplastic materials can be reinforced if needed by glass or carbon fabric. Additional loads such as carbon or aluminum can be added for thermal or electrical conductivity of the external surface. These examples are provided for exemplary purposes only and are not intended to be limiting. It is envisioned that this disclosure may be used with other erosion shield materials as well.

The thickness of erosion shield may be any appropriate thickness that allows it to functions as described herein. Non-limiting examples include from about 0.3 mm up to about 2 mm. A further specific range may include thicknesses from about 0.5 mm to about 1.5 mm.

The erosion shield 16 can be designed to improve performance by providing thickness variations to obtain any desired pre-defined pattern during shock. For example, this variation can be obtained by chemical etching for metal or by altering the lay up for a thermoset or thermoplastic shield.

The erosion shield may be fixed on the border 46 of the cell 32 defining a pneumo-expulse zone 30 by any appropriate method. For example, it may be secured using bonding, screwing, riveting, or any other appropriate fixation system. In an alternate embodiment, it may be fixed into a groove bordering the cell 32 via a rod or a seal. This fixing may be completed by one or more optional additional fixing points in the pneumo-expulse zone. The fixing method may generally include a sealing means to ensure the quality of vacuum in the recess 12. The border 36 of each cell 32 where the erosion shield 16 is fixed can define the depth of the recess.

Figure 6:
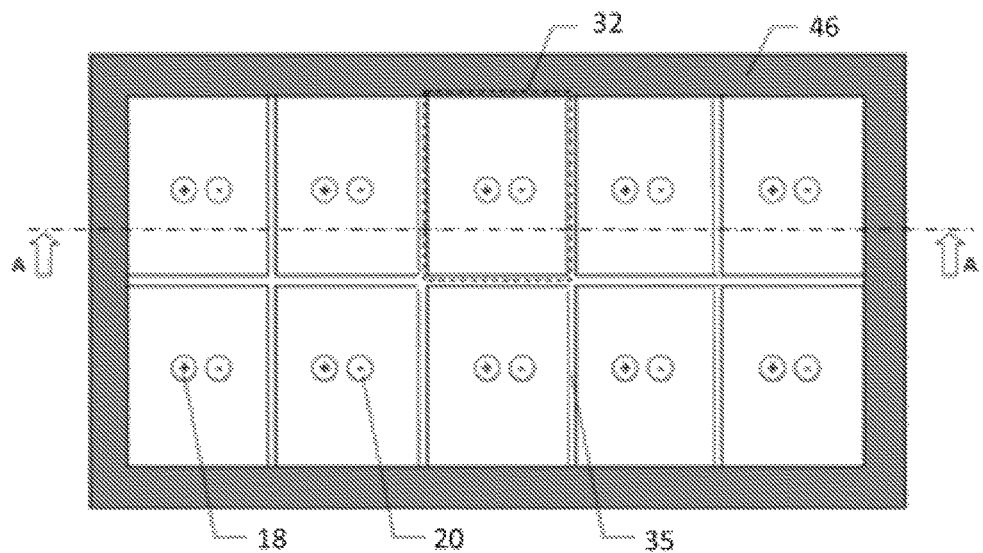
FIG. 6 shows a top view of a de-icing zone with a plurality of unitary cells divided by one or more dividing features.

FIG. 6 illustrates a top plan view of a zone 30, showing that each cell 32 may be provided with its own vacuum port 18 and pressurized fluid port 20. This figure also shows a gasket groove 35 between each cell 32, as well as the sealing surface 46 to which the erosion shield may be secured in use. FIG. 7 illustrates a cross-sectional view of an aircraft surface 14 with a de-icing system 10.

As the aircraft's engines are started, the de-icing system 10 will generally be under vacuum (with valve 22 opened and valve 24 closed). The recess is generally kept under vacuum during the flight to in order to maintain the position of erosion shield in spite of variation of external pressure along the profile and to avoid displacement. Maintaining the recess under vacuum can also help ensure the draining of the recess after pulse. Maintaining the recess under vacuum can also help increase the mechanical effect. The vacuum may be shut off before or during the pulse to modify the response of the erosion shield. Moreover, the vacuum level could be modified according to the de-icing phase step.

A shock effect may be created by very quick opening and closing of the valve system which alternately insulates and exposes the recess of the cell to pressurized fluid, such as pressurized air. This configuration can ensure aerodynamic performances of the profile protected, efficiency of the later impulse, and counter any aerodynamic effects around airfoil that may tend to deflect the erosion shield 16, allowing its elastic fixation. In this position, the erosion shield 16 is in a first negative position 40, as illustrated by dotted line 40 on FIG. 8.

If the system 10 is not connected to the pressure network of the aircraft and requires a pressure tank 28, this tank 28 may be pressurized before takeoff. If an air network of the aircraft is not able to supply the system, an additional system can be used as a compressor. This allows the system to be an autonomous system installed along a leading edge or structure.

When the de-icing function is necessary and activated, a first valve 22 (fluidly connected to a vacuum line 26) can remain opened or it may be closed, according to pre-defined de-icing laws that are set and configured for the system. In most instances, the first vacuum valve 22 will generally be closed upon activation of de-icing so that the cell 32 can experience the pressure delivered. If the level of vacuum is variable during operation of the system, the level may be increased just before the pulse to arm the recess 12 so that the pulse will be effective.

Then a second valve 24 (fluidly connected to a pressurized source) is opened during a short time to inject pulses of pressurized fluid inside the recess 12 of the cell 32.

A low surface displacement is generally desired in order for efficient de-icing to occur. The pulses create a shock effect, rather than relying on static deformation of the erosion shield 16. When the second (pressurized source) valve 24 opens, a shock wave is created and strikes the erosion shield 16. This shock wave creates the displacement of the erosion shield into the second positive position 42 shown in Figure. The shock pulse(s) causes the erosion shield 16 to pulse out to the second position 42. These pressurized pulses function to de-ice the aircraft surface. A comparison between a traditional erosion shield displacement and pulses applied to individual, unitary cells 32 is illustrated in FIG. 9. When de-icing is switched off, the first vacuum valve 22 is opened to put the recess 12 of the cell 32 under vacuum. This causes the erosion shield to return to its first position 40, generally aligned with the aircraft surface 14.

The cells 32 can be activated together or separately according to pre-defined laws. In one example, the cells 32 may be controlled independently from one another. Alternatively, the cells 32 may controlled collectively, such that a single command for delivery of fluid delivers fluid to a family of cells 32 sharing a single vacuum line and/or a single pressurized tank.

There is thus provided a system for de-icing an aircraft surface, comprising applying a shock wave to deform an erosion shield covering a recess in the aircraft surface; and returning the erosion shield to its initial position. This can occur by an arming phase, in which the erosion shield 16 is caused to take a negative shape. This negative deformation can be obtained by vacuum in the cell, or via a mechanical system such as an actuator, spring, magnetic system, or any other appropriate system that can create negative shape for the erosion shield. The erosion shield is then pulsed to a positive shape over a time period that is less than about 25 ms.

It is possible to additionally associate one or more thermal devices or thermal zones 48 with the de-icing system 10 disclosed. For example, the erosion shield may be equipped with thermal devices 48 on selected zones or where the pneumo-expulse system may not be able to de-ice due to geometry. A thermal zone 48 is illustrated by FIG. 2. This allows the pneumo-expulse de-icer system 10 to be can be used in a hybrid configuration when associated with one or more thermal de-icer systems or devices 48.

The design of the cell 32 can ensure optimal de-icing performances by reproducing as many local deformation zones as cells in the zone, even if the zone is activated with only one valve. For example, each cell may have a local displacement as if it had been activated, even if only one cell is activated with the shock wave. This is how the displacement 16a, 16b in FIG. 9 is achieved, instead of the dotted line. The pattern obtained on the surface of the shield through the seals and the structure provides a local effect of actuation in each cell. The concave shape obtained by the vacuum in the cell can be created by a small negative displacement and can increase displacement and shock effect. This geometry can boost the shearing effect on the ice interface and thus the efficiency of the system.

The geometry of the cell, including lateral over thickness or seal to create a blocking zone, allows the erosion shield 16 to be deformed according to the pattern and the recess defined. By this way, the erosion shield 16 reaches the first position 40 when recess is under vacuum. In the example shows, all of the cells 32 of the zone 30 have the same or a similar concave shape. During a pneumatic pulse, pressure in each cell 32 impacts the erosion shield 16. The shield is not inflated (as provided in some of the previous solutions), but it is quickly pulsed. This variation of behavior is illustrated by FIG. 9. The surface behavior increases the stress at the ice/erosion shield interface and the expulse force applied causes the ice to break into pieces. The use of high pressure and short pulses can limit the erosion shield 16 deformation and does not impact the performances of the profile.

The one or more ports may be provided with optional draining and exhaust systems 50, to allow quick evacuation of the pressurized fluid away from the recess. This can help avoid inflation phenomena, which can impact the reliability of the system and the aerodynamic behavior of the profile. For example, an inflation phenomena can occur if pressure in the recess increases during the pulse phase, at a time when a shock wave and inflation and deformation is applied to the erosion shield. The deformation can increase the displacement and stress in the outer skin, which can decrease its reliability. An example of a drain port 50 is shown in FIG. 3.

An exhaust port could also be added according to the mode of operation. The cells may also be equipped with a controlled air exhaust system to increase draining capability. The exhaust port can be centralized or placed at various positions in the structure.

The exhaust may be performed using a controlled valve or a mechanical regulating valve. The exhaust system may be completed by a protection system to avoid over pressure in the recess. For example, the system could include a relief valve to avoid damage in case of blocking of the valve.

In an alternate embodiment, depending upon the type of erosion shield 16 used and its stiffness, a vibrating mode may be provided. This mode can deliver very fast injection and vacuum cycles. The vibration can help cause breakage of the ice. A timer and monitoring unit 44 may be provided. The unit 44 may be electrically associated with the aircraft systems. This unit 44 can be programmed to deliver the desired pulse duration and pressure, time between pulses, and any other appropriate parameter of the system 10. In one embodiment, the timer unit 44 may be set to cycle all of the cells individually or collectively. They may be cycled at one de-icing cycle per second (and a de-icing cycle may be composed of one or multiple pulses), one pulse per minute, or at any other appropriate rate to prevent ice accumulation. This may be dependent upon temperature sensed or any other appropriate parameters.

One or more pressure sensors may be provided in order to monitor and detect any leakage or component malfunction. A pressure sensor may be positioned in or near a cell 32 and/or one or more sensors may be positioned along the vacuum line 26 and/or the pressure line 29.

Some of the advantages provided by systems designed according to this disclosure include but are not limited to: being compatible with metallic or high performance thermoplastic erosion shields that improve environmental resistance. These can be more durable than elastomeric shields. Another advantage is increasing reliability by not requiring deformation of the shield (this can reduce maintenance by providing fewer components to repair or remove). Another advantage is avoiding problems from direct lightning (if a thermoplastic shield with ESD capability is used, which can also be lighter to reduce aircraft weight). Another advantage is that the system is efficient on low ice thicknesses, e.g., from about 1 mm thick.

Because the de-icer system 10 uses short pulses, deformation is low (depending of the pressure and material but from about 0.5 mm up to about 3 mm) and occurs over a very short time. For example, the deformation is as quick as less than 25 ms. This characteristic can limit the impact on aerodynamic and can limit the performance losses of the profile.

Another advantage provided by systems designed according to this disclosure includes but is not limited to a low power de-icing system. The pneumatic actuators used require only low electrical power consumption. Additionally, actuators are not used to physically deform the erosion shield, but they control valves that create a pressurized recess, which can increase system, robustness, reliability and maintainability. The system described uses the shock and not the inflation of the outer surface. The displacement of the erosion shield will generally be between about 0.5 and 3 mm. In other embodiments, it may be between 1 and 2 mm. the shock associated with this very small displacement limits the mechanical stresses on the erosion shield and can improve its lifespan.

In short, there is provided a pneumatic de-icing system that uses pneumatic pulses. The mechanical effect on the erosion shield is created by shock effect due to pressurized fluid injection in the recess between the structure and the erosion shield.

Various other embodiments and various changes and modifications to the disclosed embodiment(s) will become apparent to those skilled in the art. Particularly, otherwise explicitly mentioned, all above described features, alternatives and/or embodiments of the present invention can be combined with each other as far as they are not incompatible or mutually exclusive of others. All such other embodiments, changes, and modifications are intended to come within the scope of the appended claims.

What is claimed is:

1. A de-icing system for an aircraft surface, comprising:
   at least one recess created in the surface, the recess comprising a plurality of unitary cells that are bounded and separated from other cells by a pattern of protrusions within the recess that divides the recess into the plurality of unitary cells,
   each cell in the plurality of cells in fluid communication with a port system for separately delivering a vacuum and a pressurized fluid to each cell;
   a single erosion shield covering the recess, wherein the single erosion shield is shared in common by the plurality of unitary cells,
   wherein each unitary cell in the plurality of unitary cells is formed as a cavity, the cavity defined at its base by the aircraft surface, defined at one or more sides by the protrusions, and defined at its upper surface by its portion of the erosion shield,
   wherein application of pressurized fluid to a first unitary cell in the plurality of unitary cells creates a pulse in the erosion shield, creating a pattern of multiple undulating waved pulses across the erosion shield.

2. The system of claim 1, wherein the plurality of unitary cells comprise individual activation zones for applying a pulse to a portion of the erosion shield covering the unitary cell.

3. The system of claim 1, wherein the pattern of protrusions within the recess that divides the recess into the plurality of unitary cells comprises raised protrusions; thermoset, thermoplastic, or elastomeric dividers; seals; metal rods; grooves; one or more machined walls to create local extra thicknesses; an elastomer profile bonded to the recess; or any combination thereof.

4. The system of claim 1, wherein the erosion shield covers the recess and creates a waved pulse upon application of pressurized fluid to the recess.

5. The system of claim 4, wherein the application of pressurized fluid is between 5 ms to 25 ms.

6. The system of claim 4, wherein the application of pressurized fluid is between 12 ms to 23 ms.

7. The system of claim 4, wherein the application of pressurized fluid is for 25 ms or less.

8. The system of claim 4, wherein the pressurized fluid comprises compressed or pressurized gas.

9. The system of claim 8, wherein the pressurized gas comprises pressurized air.

10. The system of claim 4, wherein the pressurized fluid comprises a hydraulic fluid, a hydraulic oil, a fluid containing one or more anti-icing agents, a thermal fluid, or any combination thereof.

11. The system of claim 1, wherein the port system comprises a first port fluidly connected to a vacuum line and a second port fluidly connected to a pressurized fluid source.

12. The system of claim 11, further comprising a first valve associated with the first port, a second valve associated with the second port, or both.

13. The system of claim 11, wherein introduction of pressurized fluid into the second port when the first port is closed via a valve causes the erosion shield to create a positive pulsed shape.

14. The system of claim 11, wherein introduction of vacuum into the first port when the second port is closed via a valve causes the erosion shield to lie in a negative shape.

15. The system of claim 1, wherein the recess is 1 mm or less.

16. The system of claim 1, wherein the recess is between 0.2 mm and 0.8 mm.

17. The system of claim 1, wherein the recess is between 0.4 mm and 0.6 mm.

18. The system of claim 1, wherein the aircraft structure comprises a leading edge of an aircraft wing.

19. A de-icing system for an aircraft structure, comprising:
   an erosion shield over a recess in the aircraft structure, the recess comprising a plurality of unitary cells, each unitary cell in the plurality of unitary cells formed as a cavity, the cavity defined at its base by the aircraft structure, defined at one or more sides and separated from neighboring unitary cells by a pattern of protrusions within the recess that divides the recess into the plurality of unitary cells comprises, and defined at its upper surface by its portion of the erosion shield, each of the unitary cells in fluid communication with a port system;

a pneumatic system for creating a shock pulse across the erosion shield from within the aircraft structure, such that a pressurized fluid is delivered via the port system to the recess between the aircraft structure and the erosion shield, wherein application of pressurized fluid to a first unitary cell in the plurality of unitary cells creates a pulse in the erosion shield, creating a pattern of multiple undulating waved pulses across the erosion shield.

20. The system of claim 19, wherein the shock pulse comprises a pneumatic shock pulse.

21. The system of claim 19, wherein a mechanical effect on the erosion shield is created by shock pulse due to injection of the pressurized fluid in the recess between the aircraft structure and the erosion shield.

22. A method for de-icing an aircraft surface, comprising providing the deicing system of claim 1, and applying a shock wave to deform the erosion shield by delivering pressurized fluid through the port system; and introducing a vacuum through the port system in order to allow the erosion shield to return to its initial position or to a negative shaped position.

23. The method of claim 22, further comprising an arming phase, in which the erosion shield is caused to take the negative shape.

24. The method of claim 22, wherein the erosion shield is pulsed to a positive shape.

25. The method of claim 22, wherein the erosion shield is pulsed in a vibrating mode.

26. A method for de-icing an aircraft surface, comprising providing the deicing system of claim 19, and applying a shock wave to deform the erosion shield by delivering pressurized fluid through the port system; and introducing a vacuum through the port system in order to allow the erosion shield to return to its initial position or to a negative shaped position.

\* \* \* \* \*